(12) United States Patent
Gehrt et al.

(10) Patent No.: US 11,137,367 B2
(45) Date of Patent: Oct. 5, 2021

(54) ELECTROLYTE CONDUCTOR, PROCESS FOR MANUFACTURING AN ELECTROLYTE CONDUCTOR AS WELL AS AN ELECTROCHEMICAL GAS SENSOR AND A GAS-MEASURING DEVICE WITH SUCH A GAS SENSOR

(71) Applicant: Dräger Safety AG & Co. KGaA, Lübeck (DE)

(72) Inventors: Joachim Gehrt, Stockelsdorf (DE); Susanne Schaefer, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 664 days.

(21) Appl. No.: 15/348,163

(22) Filed: Nov. 10, 2016

(65) Prior Publication Data

US 2017/0131228 A1    May 11, 2017

(30) Foreign Application Priority Data

Nov. 11, 2015    (DE) ...................... 10 2015 014 515.0

(51) Int. Cl.
*G01N 27/00* (2006.01)
*B29C 65/00* (2006.01)
(Continued)

(52) U.S. Cl.
CPC ............. *G01N 27/40* (2013.01); *B29C 65/02* (2013.01); *B29C 65/4815* (2013.01);
(Continued)

(58) Field of Classification Search
CPC ....... B29C 59/026; B29C 59/06; B29C 65/02; B29C 65/04; B29C 65/08; B29C 65/18; B29C 65/38; B29C 65/4815; B29C 65/7891; B29C 66/00441; B29C 66/712; B29C 66/7212; B29C 66/7232; B29C 66/7294; B29C 66/7392; B29C 66/7465; B29C 66/81433; B29C 66/8322;
(Continued)

(56) References Cited

U.S. PATENT DOCUMENTS 4,324,606 A  *  4/1982  Withers ................. B01D 69/10
                                                      156/272.2
5,437,928 A      8/1995  Thimons et al.
(Continued)

FOREIGN PATENT DOCUMENTS

CN         86108792 A      9/1987
CN          1134130 A     10/1996
(Continued)

OTHER PUBLICATIONS

Chinese Doctoral Dissertations Fill-text Database Engineering Science and Technology, vol. 3, issued Apr. 15, 2015.
Zitierung 10 2015 014 515.0; 1 page; 2015.

*Primary Examiner* — Linda L Gray
(74) *Attorney, Agent, or Firm* — McGlew and Tuttle, P.C.

(57) ABSTRACT

An electrolyte conductor (1) has a nonwoven fabric (2), onto which a plastic film (3) is laminated. A process is provided for the manufacture of the electrolyte conductor (1). An electrochemical gas sensor (10) is provided with such an electrolyte conductor (1). A gas-measuring device is provided with such a gas sensor (10).

20 Claims, 3 Drawing Sheets

(51) Int. Cl.
| | |
|---|---|
| *B32B 37/00* | (2006.01) |
| *G01N 27/40* | (2006.01) |
| *G01N 27/404* | (2006.01) |
| *B29C 65/02* | (2006.01) |
| *B29C 65/78* | (2006.01) |
| *B29C 65/48* | (2006.01) |
| *G01N 27/403* | (2006.01) |
| *B29C 65/18* | (2006.01) |
| *B29C 65/04* | (2006.01) |
| *B29C 65/38* | (2006.01) |
| *B29C 65/08* | (2006.01) |
| *B29C 59/02* | (2006.01) |
| *B32B 38/00* | (2006.01) |
| *B29K 105/08* | (2006.01) |
| *B29K 227/18* | (2006.01) |
| *B29L 31/34* | (2006.01) |

(52) U.S. Cl.
CPC .... *B29C 65/7891* (2013.01); *B29C 66/00441* (2013.01); *B29C 66/1122* (2013.01); *B29C 66/30325* (2013.01); *B29C 66/45* (2013.01); *B29C 66/712* (2013.01); *B29C 66/7212* (2013.01); *B29C 66/7294* (2013.01); *B29C 66/7392* (2013.01); *B29C 66/73171* (2013.01); *B29C 66/7465* (2013.01); *B29C 66/81433* (2013.01); *B29C 66/82* (2013.01); *B29C 66/8322* (2013.01); *B29C 66/83411* (2013.01); *B32B 37/00* (2013.01); *G01N 27/403* (2013.01); *G01N 27/404* (2013.01); *B29C 59/026* (2013.01); *B29C 65/04* (2013.01); *B29C 65/08* (2013.01); *B29C 65/18* (2013.01); *B29C 65/38* (2013.01); *B29C 66/71* (2013.01); *B29C 66/7352* (2013.01); *B29C 66/73521* (2013.01); *B29C 66/8122* (2013.01); *B29K 2105/0854* (2013.01); *B29K 2227/18* (2013.01); *B29L 2031/34* (2013.01); *B32B 38/0004* (2013.01)

(58) Field of Classification Search
CPC ......... B29C 66/83411; B29C 66/73521; B32B 37/203; B32B 37/1045; B32B 37/06; B32B 37/04; B32B 37/0084; B32B 38/0004; B32B 38/004; B32B 38/06; B32B 2038/042; B32B 43/003; B32B 2250/20; B32B 2262/101; B32B 2307/728; B32B 2307/58; B32B 2310/028; B32B 2315/085; B32B 37/0076; G01N 27/40; Y10T 156/1039
USPC ............ 156/308.3, 272.2, 583.1, 583.2, 290, 156/308.2
See application file for complete search history.

(56) References Cited

U.S. PATENT DOCUMENTS

| | | |
|---|---|---|
| 2004/0247836 A1 | 12/2004 | Biagiotti |
| 2006/0078781 A1 | 4/2006 | Stegink et al. |
| 2009/0081518 A1* | 3/2009 | Miyachi ............ B01D 67/0011 429/490 |
| 2010/0015406 A1 | 1/2010 | Bhatnagar et al. |

FOREIGN PATENT DOCUMENTS

| | | | |
|---|---|---|---|
| CN | 1291938 | A | 4/2001 |
| CN | 1734262 | A | 2/2006 |
| CN | 101443199 | A | 5/2009 |
| CN | 102049955 | A | 5/2011 |
| CN | 103254574 | A | 8/2013 |
| DE | 1 42 456 | A5 | 6/1980 |
| DE | 39 29 304 | A1 | 3/1991 |
| DE | 694 28 542 | T2 | 4/2002 |
| DE | 699 13 122 | T2 | 5/2004 |
| DE | 10 2004 037 312 | A1 | 3/2006 |
| EP | 0 031 724 | B1 | 8/1984 |
| EP | 0 226 911 | B1 | 7/1990 |
| EP | 1 846 254 | B1 | 7/2012 |
| WO | 2003/092 090 | A2 | 11/2003 |
| WO | 2006124825 | A2 | 11/2006 |

* cited by examiner

ELECTROLYTE CONDUCTOR, PROCESS FOR MANUFACTURING AN ELECTROLYTE CONDUCTOR AS WELL AS AN ELECTROCHEMICAL GAS SENSOR AND A GAS-MEASURING DEVICE WITH SUCH A GAS SENSOR

CROSS REFERENCE TO RELATED APPLICATIONS

This application claims the benefit of priority under 35 U.S.C. § 119 of German Application 10 2015 014 515.0 filed Nov. 11, 2015, the entire contents of which are incorporated herein by reference.

FIELD OF THE INVENTION

The present invention pertains to an electrolyte conductor with a nonwoven fabric, a process for manufacturing an electrolyte conductor, an electrochemical gas sensor, a gas-measuring device with the electrochemical gas sensor and the aforementioned process using the electrolyte conductor for conducting an electrolyte in an electrochemical gas sensor.

BACKGROUND OF THE INVENTION

Using binder-free glass fiber mats as electrolyte conductors ("wick") in electrochemical gas sensors, for example, is known from the state of the art.

For this, the electrolyte conductors have a minimal thickness, so that glass fiber mats saturated with electrolyte are mechanically stable. Thinner glass fiber mats disintegrate and may then no longer conduct the electrolyte. In order to achieve mechanical stability, nonwovens of at least 200 µm to 300 µm are used according to the state of the art. These nonwoven thicknesses have the drawback that a relatively large volume of electrolyte is absorbed by the glass fiber mat. In case of sulfuric-acid-based electrolytes, a larger absorbed electrolyte volume results in a larger free housing volume, because the electrolyte volume can expand because of the hygroscopic property of the sulfuric acid. The use of sulfuric acid electrolyte means that the nonwoven thickness has an effect on the size of an electrochemical gas sensor. Hence, with nonwoven thicknesses of more than 200 µm to 300 µm, a relatively large sensor housing is also required. As a result, the development of smaller, portable (multi-) gas-measuring devices is not possible.

SUMMARY OF THE INVENTION

Hence, an object of the present invention is to develop an electrolyte conductor, which has a small size and does not absorb much electrolyte, but yet is stable and durable and conducts electrolyte reliably. The electrolyte conductor shall, in addition, be able to be manufactured in a simple and cost-effective manner and be able to be used in gas sensors wherever possible. In this connection, the nonwoven volume susceptible to electrolyte shall be adjustable. An as compact as possible electrochemical gas sensor and a compact gas-measuring device, which have such an electrolyte conductor, should, moreover, be developed.

According to the invention an electrolyte conductor is provided with a nonwoven fabric. A plastic film is laminated onto the nonwoven fabric.

It is advantageous according to the invention that the plastic film has a mechanical stability, which is independent of the contact with the electrolyte. As a result, the plastic film stabilizes the nonwoven fabric. Collapsing, tearing or disintegration of the nonwoven fabric when saturated with electrolyte is also prevented in case of small nonwoven thicknesses. The volume of an absorbed electrolyte is also correspondingly small and, e.g., a housing of an electrochemical sensor may have a compact configuration. In this case, the lamination can be implemented in a cost-effective manner.

The nonwoven fabric is a glass fiber mat according to a special embodiment variant. The nonwoven fabric is especially suited as an electrolyte conductor in electrochemical sensors. The nonwoven fabric is preferably binder-free. In addition, the nonwoven fabric shall be free from plasticizers, silicones and binders. These properties prevent waste gas emissions from contaminating a catalyst material in an electrochemical gas sensor.

In an optional embodiment, the nonwoven fabric has a nonwoven thickness of less than 300 µm, preferably less than 200 µm, more preferably less than 140 µm, especially preferably less than 80 µm and most preferably less than 50 µm. These small nonwoven thicknesses are possible especially due to the stabilization by means of the plastic film and lead to a very small absorption volume for the electrolyte. It is sufficient when the plastic film is laminated onto the nonwoven fabric only on one side.

In principle, the lamination may be carried out such that the plastic film is laminated all over on the nonwoven fabric. The bonding and the electrolyte conductor are correspondingly stable. However, an all-over lamination is critical in terms of process since the penetration of the plastic film or of the resulting hot-melt adhesive during the lamination can be controlled with difficulty only. The border between an unformed bond and a complete flooding of the nonwoven fabric with hot-melt adhesive is fluid. As soon as a flooding occurs, the electrolyte conductor becomes hydrophobic and thus can no longer be used for aqueous electrolyte. Another problem of the all-over lamination is an optional rolling up of the composite film after lamination because of the shrinkage properties of the plastic film.

A variant of the present invention avoids these problems by the plastic film being laminated onto the nonwoven fabric partially, especially in a pattern. During the partial lamination, the nonwoven fabric is bonded selectively with the plastic film or its hot-melt adhesive, for example, by means of a punch or roller and becomes selectively hydrophobic only there as well. The nonlaminated areas in the nonwoven fabric remain hydrophilic and ensure the transport of electrolyte. In addition, it is advantageous that the nonwoven volume susceptible to electrolyte is adjustable due to the ratio of laminated to nonlaminated surface. Fastening areas can be laminated, for example, all over. The pattern may have a grid-like, strip-like or dot-like configuration, among others. The pattern may be selected in a manner specific to the application.

In order to achieve a small size, the plastic film preferably has a film thickness of at most 80 µm, preferably at most 50 µm and most notably from 30 µm to 50 µm. Corresponding to the usage location of the electrolyte conductor, the plastic film shall be resistant to the electrolyte used. In addition, the plastic film shall be free from plasticizers and silicones. As a result of this, there is no contamination of a catalyst material due to waste gas emissions during a use in an electrochemical gas sensor.

For lamination, a hot-melt adhesive film is especially suited as a plastic film. Plastic films made of polyethylene (PE), polyvinyl chloride (PVC) or ethylene vinyl acetate (EVA) are especially suitable for use in electrochemical sensors.

A simple manufacturing process is achieved by a special embodiment, according to which a plastic separating film is laminated onto the plastic film, the plastic separating film having a higher heat resistance than the plastic film. During the lamination under pressure below the melting point of the plastic separating film, the plastic film is bonded with the nonwoven and the plastic separating film. In this case, the plastic separating film prevents a bonding with the applying tool, e.g., with a roller or a punch.

When an especially compact electrolyte conductor is desired, the plastic separating film can again be removed from the plastic film after the lamination. Provided the plastic separating film remains on the electrolyte conductor, a special embodiment provides that the plastic separating film has a film thickness of at most 80 µm, preferably at most 50 µm and most notably of 30 µm to 50 µm. Thus, the electrolyte conductor remains relatively thin.

A variant, in which the plastic separating film consists of polytetrafluoroethylene (PTFE), is especially suitable. This material is especially resistant to heat and is also uncritical for use in an electrochemical sensor. For this, no plasticizers or silicones shall be contained in the PTFE.

The present invention pertains, in addition, to a process for manufacturing an electrolyte conductor, especially an electrolyte conductor as it is described above and below, in which a placing of a first web of nonwoven fabric and a second web of plastic film on top of one another is first carried out. The first web and the second web are then bonded by lamination to form a composite web. Then, either a punching or cutting of an especially two-dimensional shape out of the composite web is carried out, or, as an alternative, the composite web is wound up to form a roll.

Thus, a large-area composite web is manufactured in a simple manner directly from the electrolyte conductor or will able to be separated out only later.

So that the laminating tools used do not bond with the plastic film, a third web of plastic separating film may optionally be placed onto the second web of plastic film for lamination.

Preferably, the third web of plastic separating film is again removed from the plastic film after the lamination.

As starting materials, the webs may be provided as single sheets or as rolls depending on production quantity and production plant.

In terms of process, a roller or press is especially suitable for lamination. Processes and/or devices from the group consisting of a hot roller or hot punch, ultrasound, heat pulses or high frequency are suitable for generating the process heat for melting the plastic film. The processes must bring about a temperature above the melting point of the plastic film in the area of the desired lamination bond. The degree of melting of the plastic film and thus the penetration of the hot-melt adhesive into the nonwoven fabric is, for example, dependent on the roller or press temperature, roller gap, pressure and duration of feed or pressing and can be adjusted with the optional processes.

Therefore, a roller or a punch, on which raised sections are arranged in a pattern, can be used for the lamination for generating partial lamination bonds. The raised sections may preferably have a cylindrical, pyramid-shaped or frustoconical configuration for generating a dot pattern.

Furthermore, the present invention also pertains to an electrochemical gas sensor with an electrolyte conductor as is described above and below or as is manufactured according to a process described above or below. Because of the compactness of the electrolyte conductor, the sensor is likewise compact and lightweight.

In a special variant of the electrochemical gas sensor, the electrolyte conductor forms an electrolyte conduction for an electrolyte from an electrolyte reservoir in the direction of an electrode. Thus, an electrode may be supplied with electrolyte even in the case of a low filling level in the electrolyte reservoir and also, to a certain extent, independent of position for the electrochemical reaction.

A special embodiment of the electrochemical gas sensor provides that this gas sensor has a sensor housing with an annular outer wall and an annular inner wall, an annular electrolyte reservoir being formed between the outer wall and the inner wall. An inner area with at least one electrode is formed in the center of the inner wall. In this case, the electrolyte conductor lies at least partially annularly on a reservoir bottom of the electrolyte reservoir. Thus, an electrolyte in the electrolyte reservoir can be absorbed by the nonwoven fabric and is distributed in the volume of the nonwoven fabric. If the reservoir bottom is slanted or only a few drops of the electrolyte are still present in the electrolyte reservoir, the electrolyte changes its position due to the distribution of the nonwoven fabric and can again be removed from the nonwoven fabric at another point.

Preferably, the plastic film lies on the reservoir bottom and the nonwoven fabric points away from the reservoir bottom. Because of the inherent stiffness of the electrolyte conductor based on the plastic film, a fixing on the reservoir bottom is not necessary.

A second electrolyte conductor, which is contacted with the electrolyte conductor in the electrolyte reservoir and protrudes through or over the inner wall into the inner area, is provided according to a special embodiment of the electrochemical gas sensor. In this way the second electrolyte conductor can extract electrolyte from the electrolyte conductor in the electrolyte reservoir and conducts this electrolyte to the electrode in the inner area.

The nonwoven fabric is preferably a glass fiber mat. This nonwoven fabric does not release any substances to the electrolyte that are critical for the measurement.

The material thickness of the nonwoven fabric of the second electrolyte conductor is preferably between 100 µm and 500 µm, more preferably between 150 µm and 400 µm, even more preferably between 170 µm and 350 µm and especially preferably between 200 µm and 300 µm.

Optionally, the second electrolyte conductor is configured as an electrode with the nonwoven fabric on a noble metal film.

For example, sulfuric acid is suitable as electrolyte.

A plurality of electrodes may also optionally be arranged in the inner area. As a result of this, the measuring sensitivity of the gas sensor increases.

In addition, the present invention pertains to a gas-measuring device with an electrochemical gas sensor as is described above and below. Such a gas-measuring device may be configured as mobile and manageable because the sensor is also compact. This is especially important in one variant, in which the gas-measuring device is equipped with at least one second electrochemical gas sensor as it is described above and below. In this way, multi-gas-measuring devices can also be provided as compact and manageable.

Moreover, the present invention pertains to the use of an electrolyte conductor as it is described above and below for conducting an electrolyte in an electrochemical gas sensor, preferably in an electrochemical gas sensor as it is described above and below. Even the smallest quantities of electrolyte can still be conducted to the destination site with certainty with such an electrolyte conductor.

Further features, details and advantages of the present invention appear from the wording of the claims as well as from the following description of an exemplary embodiment based on drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
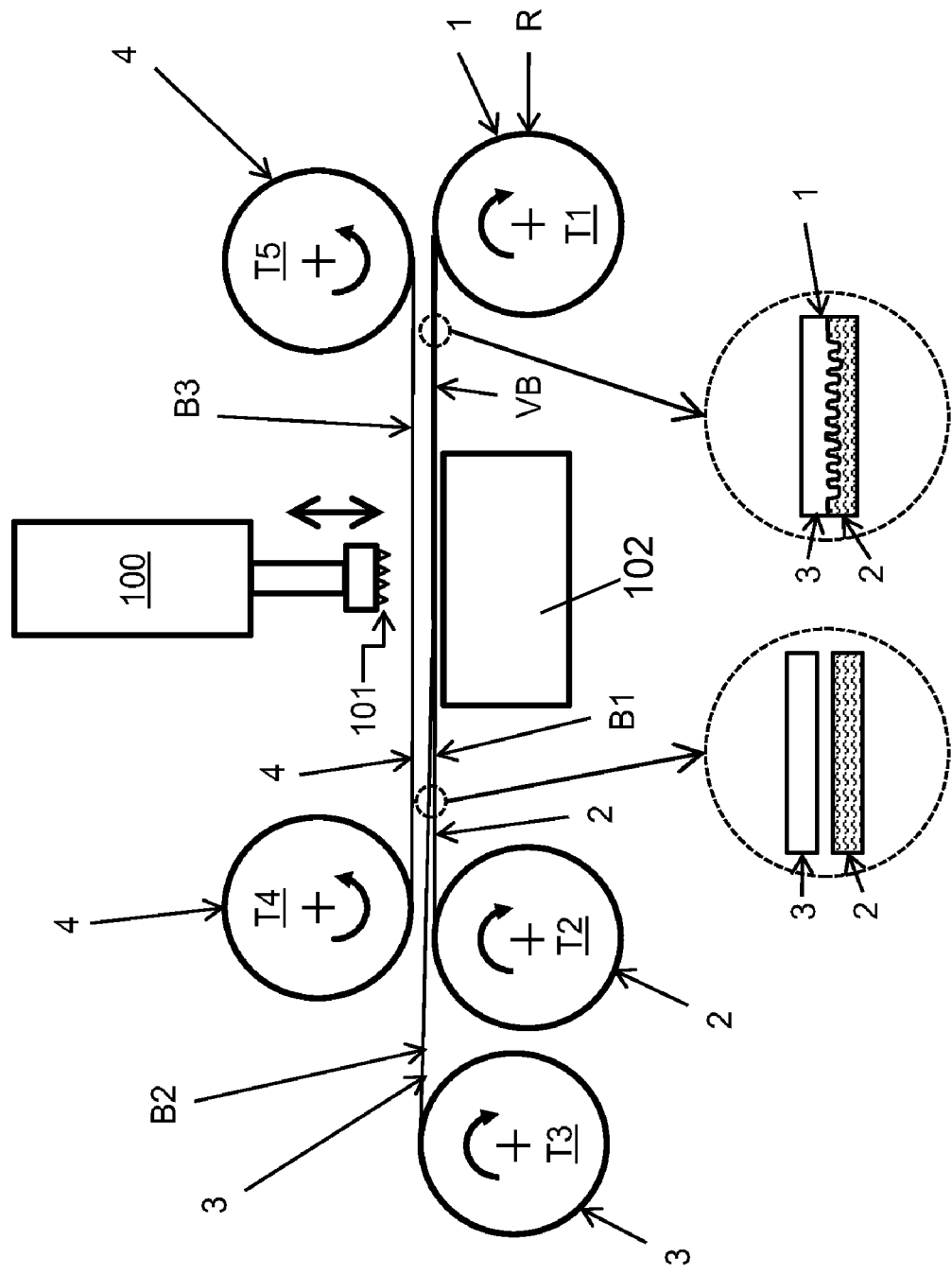
FIG. 1 is a schematic view of a device for manufacturing an electrolyte conductor.

Referring to the drawings, a device for manufacturing an electrolyte conductor 1, which is wound up to form a roll R on a first spool or drum T1 at the output of the device, is seen in a schematic view in FIG. 1.

This first drum T1 pulls down a first web B1 of nonwoven fabric 2 and a second web B2 of plastic film 3 from a second and a third drum T2, T3. The second and third drums T2 and T3 lie behind one another, so that the first web B1 and the second web B2 are pulled approximately parallel and adjacent to one another over a punch support 102.

The first web B1 and the second web B2 are placed on top of one another at the latest during the traveling of a punch 100 in the direction of the punch support 102. In addition, the first web B1 and the second web B2 are bonded with one another to form a composite web VB during the traveling of the punch 100, as a result of which the plastic film 3 is laminated onto the nonwoven fabric 2 on one side. The plastic film 3 is hereby heated at least partially to a temperature above the melting point. Besides a pure pressurization by the punch, this may optionally be carried out by heating the punch 100, ultrasound, heat pulses or high frequency.

In principle, the plastic film 3 can be laminated all over onto the nonwoven fabric 2. In the variant preferred and shown, lamination is, however, carried out in a dot matrix.

For this, the punch 100 has pointed raised sections 101 on the punch surface, which raised sections are arranged in a pattern. These raised sections 101 may have a pyramid-shaped, conical, truncated-pyramid-shaped or frustoconical configuration.

According to the image direction of the enlarged section shown on the bottom right-hand side, the resulting selective penetration of molten plastic film 3 into the nonwoven fabric 2 is seen. In the areas not traversed by plastic, the nonwoven fabric 2 remains hydrophilic and can later ensure the transport of electrolyte. The nonwoven volume susceptible to electrolyte is adjusted by the ratio of laminated to nonlaminated surface.

The first web B1 of nonwoven fabric 2 consists of a glass fiber mat, is binder-free as well as free from plasticizers, silicones and binders. The nonwoven fabric 2 has a nonwoven thickness of less than 300 μm, preferably less than 200 μm, more preferably less than 140 μm, especially preferably less than 80 μm and most preferably less than 50 μm.

Furthermore, the plastic film 3 has a film thickness of at most 80 μm, preferably at most 50 μm and most notably 30 μm to 50 μm. It is resistant to electrolyte and heat as well as free from plasticizers and silicones. It is especially a so-called hot-melt adhesive film, which preferably consists of polyethylene (PE), polyvinyl chloride (PVC) or ethylene vinyl acetate (EVA).

So that the plastic film 3, which lies visibly on the side of the nonwoven fabric 2, which points towards the punch 100, does not remain adhered to the punch 100 or to the raised sections 101, a third web B3, which is parallel to the first and second web B1, B2, is stretched parallel and on the side of the punch 100 over the punch support 102. The third web B3 is hereby pulled from a fourth drum T4 to a fifth drum T5.

During the lamination, first the third web B3, which is a plastic separating film 4, is placed onto the second web B2 of the plastic film 3 due to the traveling of the punch 100. As is seen, the third web B3 of plastic separating film 4 is, however, directly removed again from the plastic film 3 during the removal of the punch 100, i.e., after the lamination (first case). If the tension of the third web B3 is set lower, the first drum T1 and the fifth drum T5, which are arranged adjacent to one another, again remove the third web B3 from the second web B2 (second case). In the first case, the feed rate of the third web B3 may deviate from the feed rate of the first and second web B1, B2, may especially be lower, in order to consume as little plastic separating film 4 as possible. In the second case, the feed rates of all three webs B1, B2 and B3 are selected to be identical (except for shrinkage patterns during bonding).

The plastic separating film 4 has a higher heat resistance than the plastic film 3. As a result of this, a stable intermediate layer is formed on the punch 100, which consequently does not bond with the melting plastic film 3 and also not with the plastic separating film 4. In order to be able to readily exert pressure with the raised sections 101 through the plastic separating film 4 onto the plastic film 3 and onto the nonwoven fabric 2, the plastic separating film 4 shall have a film thickness of at most 80 μm, preferably at most 50 μm and most notably from 30 μm to 50 μm. The plastic separating film 4 preferably consists of polytetrafluoroethylene PTFE.

In an optional variant of the present invention, the plastic separating film 4 may remain as part of the composite web VB. It would then be wound up onto the drum T1 with the composite web VB as electrolyte conductor 1 to form a roll R.

Electrolyte conductors 1 with defined two-dimensional contour may later be cut or punched out of the composite web VB.

Optionally, the cutting out may be carried out between the punch support 102 and the first drum T1. Only the remaining residual web is then wound up to form the roll R.

Figure 2:
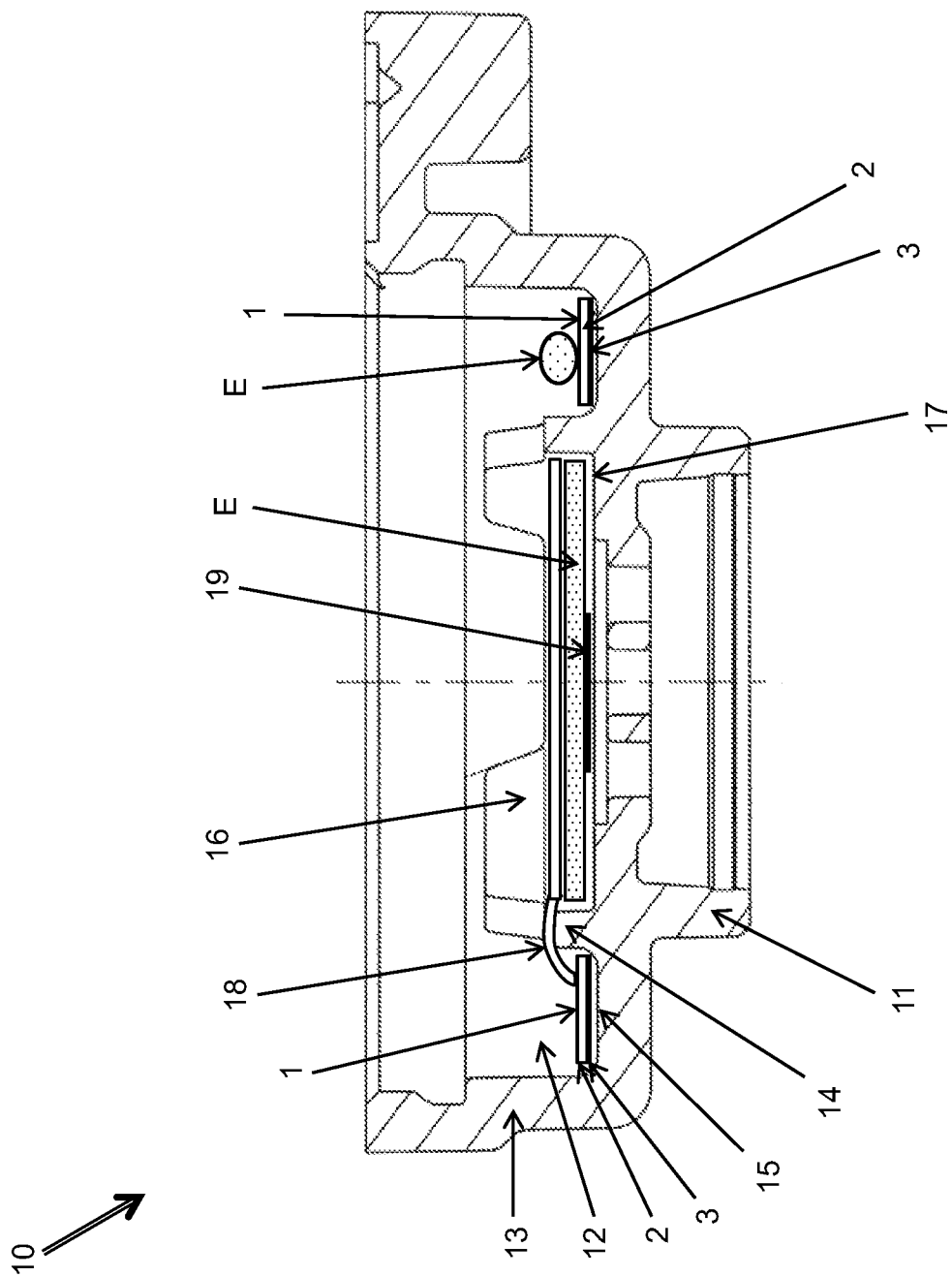
FIG. 2 is a cross section through an electrochemical gas sensor with an electrolyte conductor.
Figure 3:
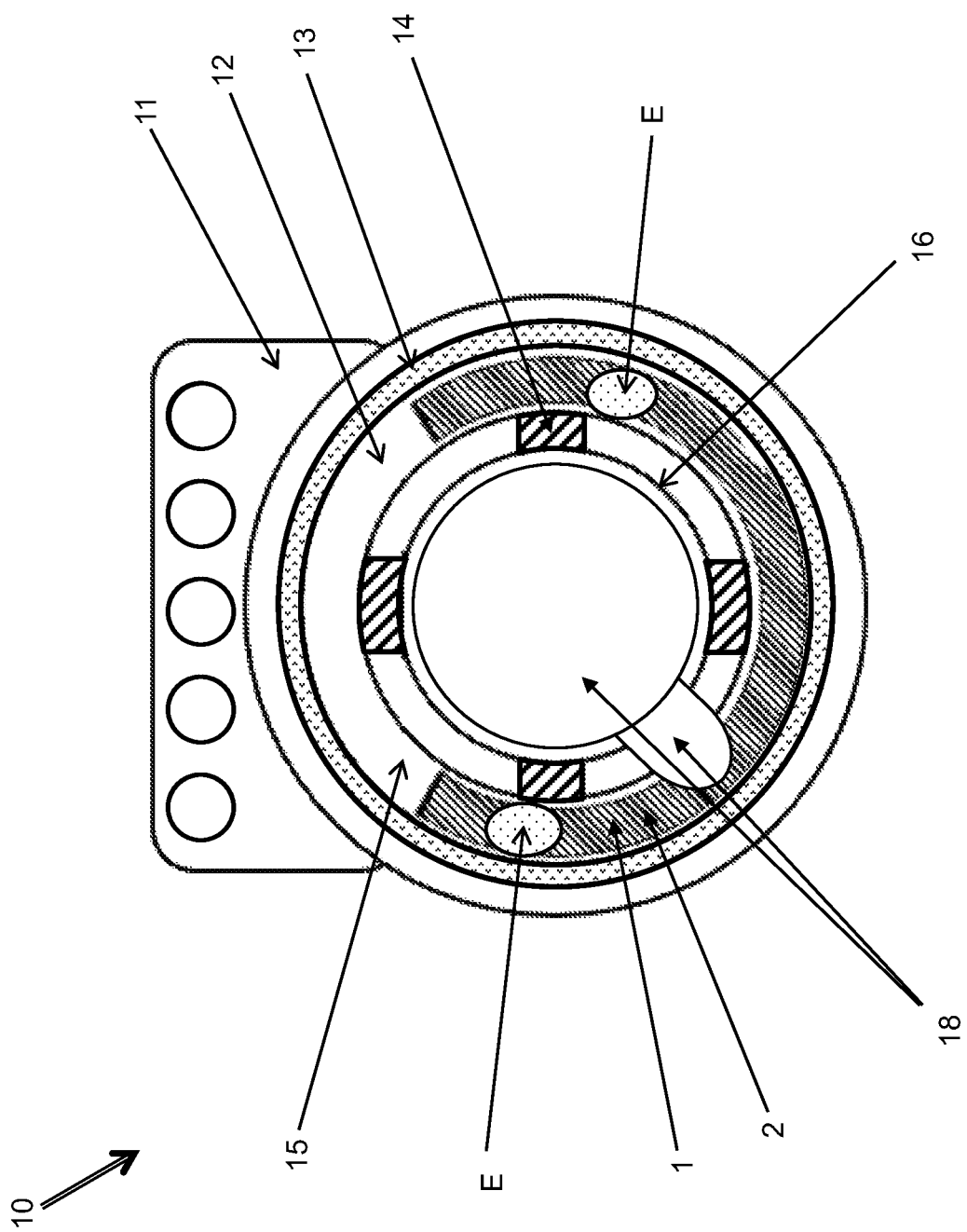
FIG. 3 is a top view of an electrochemical gas sensor with an electrolyte conductor.

FIG. 2 shows a cross section through an electrochemical gas sensor 10. FIG. 3 shows a top view of such an electrochemical gas sensor 10.

According to FIGS. 2 and 3, a sensor housing 11 of the gas sensor 10 has an annular outer wall 13 and an annular inner wall 14, so that an annular electrolyte reservoir 12 is formed between the outer wall 13 and the inner wall 14. An electrolyte conductor 1 lies on the reservoir bottom 15 of the electrolyte reservoir 12, especially at least partially annularly around the inner wall 14.

The electrolyte conductor 1 consists of a nonwoven fabric 2, which is laminated onto a plastic film 3 (shown only in FIG. 1). This nonwoven fabric 2 may have one of the optional configuration variants according to the explanations in the general description and concerning FIG. 1. In this case, the plastic film 3 (shown only in FIG. 1) of the electrolyte conductor 1 lies on the reservoir bottom 15 and the nonwoven fabric 2 points away from the reservoir bottom 15. Because of the inherent stiffness of the electrolyte conductor 1 based on the plastic film 3 (shown only in FIG. 1), a fixing on the reservoir bottom 15 is not necessary.

An inner area 16 is formed in the center of the inner wall 14. An electrode 19 (shown only in FIG. 1) is arranged in this inner area 16. A plurality of electrodes may optionally also be arranged in the inner area 16.

The inner wall 14 has a wave-shaped upper edge, over which, however, flow is possible over the entire circumference. For this, a housing cover, not shown, can be arranged spaced apart from the inner wall 14. An electrolyte E will flow over the inner wall 14 on the path from the electrolyte reservoir 12 to the inner area 16 or vice versa, i.e., primarily through the wave valleys in the upper edge.

A second electrolyte conductor 18, which is contacted with the electrolyte conductor 1 in the electrolyte reservoir 12 and protrudes over the inner wall 14 into the inner area 16 in the area of a wave valley of the upper edge, is provided for supporting the transport of the electrolyte E from the electrolyte reservoir 12 to the inner area 16. It is seen that the second electrolyte conductor 18 extends approximately over the entire inner area 16. Space for electrodes is provided under the second electrolyte conductor 18 in the inner area 16 and electrolyte E can collect here. A closed inner area bottom 17 is provided for this (shown only in FIG. 1).

The second electrolyte conductor 18 consists of a nonwoven fabric. The nonwoven fabric is a glass fiber mat, the material thickness of which is between 100 μm and 500 μm. This nonwoven fabric is thus so thick that it is inherently stable and manageable even without plastic film laminated onto it. Optionally, the second electrolyte conductor 18 can be configured directly as an electrode by the nonwoven fabric being bonded with a noble metal, e.g., a noble metal film.

Due to the arrangement, the second electrolyte conductor 18 can remove electrolyte E from the electrolyte conductor 1 at the contact point in the electrolyte reservoir 12 and conduct this electrolyte to the electrode 19 (shown only in FIG. 1) in the inner area 16. For example, sulfuric acid is suitable as electrolyte E.

Thus, the electrolyte conductor 1 in the electrolyte reservoir 12 forms here an electrolyte conduction for an electrolyte E from the electrolyte reservoir 12 in the direction of the electrode 19, namely up to the second electrolyte conductor 18, which takes over the transport of the electrolyte E over the remaining distance up to the electrode 19.

Due to the arrangement of the electrolyte conductor 1 in the electrolyte reservoir 12, the electrode 19 may also be supplied with electrolyte E even in the case of a low filling level in the electrolyte reservoir 12 and also, to a certain extent, independent of position for the electrochemical reaction.

The isolated drops of electrolyte E in the electrolyte reservoir 12 shown as an example are namely absorbed by the nonwoven fabric 2 of the electrolyte conductor 1 and distributed in the volume of the nonwoven fabric 2. If the reservoir bottom 12 is, for example, slanted, the electrolyte E is, as a result, also fed upwards geodetically. Thus, the electrolyte E changes its position at least partially over the distribution in the nonwoven fabric 2 and can again be removed from the nonwoven fabric 2 at another point, namely at the contact to the second electrolyte conductor 18.

The present invention is not limited to one of the described embodiments, but rather can be varied in many ways.

All features and advantages, including design details, spatial arrangements and process steps, appearing from the claims, the description and the drawings may be essential to the present invention both in themselves and in the widest variety of combinations.

While specific embodiments of the invention have been shown and described in detail to illustrate the application of the principles of the invention, it will be understood that the invention may be embodied otherwise without departing from such principles.

LIST OF REFERENCE NUMBERS

1 Electrolyte conductor
2 Nonwoven fabric
3 Plastic film
4 Plastic separating film
10 Electrochemical gas sensor
11 Sensor housing
12 Electrolyte reservoir
13 Outer wall
14 Inner wall
15 Bottom of reservoir
16 Inner area
17 Bottom of inner area
18 Second electrolyte conductor
19 Electrode
100 Punch
101 Raised section
102 Punch support
B1 First web
B2 Second web
B3 Third web
E Electrolyte
R Roll
T1 First drum
T2 Second drum
T3 Third drum
T4 Fourth drum
T5 Fifth drum
VB Composite web

What is claimed is:

1. A process for manufacturing an electrolyte conductor comprising a nonwoven fabric; and a plastic film laminated onto the nonwoven fabric, the process comprising the steps of:

providing a first web of nonwoven fabric;
providing a second web of plastic film;
laying the first web of nonwoven fabric and the second web of plastic film on top of one another;
bonding the first web and the second web together to form a composite web by laminating, wherein the second web of plastic film is laminated partially onto only one side of the first web of nonwoven fabric in a pattern, the first web of nonwoven fabric comprising another side located opposite the one side, wherein the another side is free of lamination; and punching or cutting a two-dimensional shape out of the composite web or winding up the composite web to form a roll.

2. A process in accordance with claim 1, wherein a third web of plastic separating film is placed onto the second web of plastic film and the third web of plastic separating film is bonded to the second web of plastic film by laminating.

3. A process in accordance with claim 2, wherein the third web of plastic separating film is removed from the second web of plastic film after the lamination.

4. A process in accordance with claim 1, wherein the lamination is carried out with a roller or with a punch, on which raised sections are arranged in a pattern, wherein no side of the first web of nonwoven fabric is laminated except for the one side of the first web of nonwoven fabric.

5. A process in accordance with claim 1, further comprising:
providing an electrochemical gas sensor with the electrolyte conductor, an electrode, an electrolyte reservoir and an electrolyte
with the electrolyte conductor forming an electrolyte conduction for conduction of the electrolyte from the electrolyte reservoir in a direction of the electrode in the electrochemical gas sensor.

6. A process in accordance with claim 1, wherein the nonwoven fabric is a glass fiber mat.

7. A process in accordance with claim 1, wherein the nonwoven fabric has a thickness of less than 300 µm.

8. A process in accordance with claim 1, wherein the plastic film has a film thickness of at most 80 µm.

9. A process in accordance with claim 1, wherein the plastic film is a hot-melt adhesive film.

10. A process in accordance with claim 1, wherein a plastic separating film is laminated onto the second web of plastic film, the plastic separating film having a heat resistance that is greater than a heat resistance of the second web of plastic film.

11. A process in accordance with claim 10, wherein the plastic separating film has a film thickness of at most 80 µm.

12. A process in accordance with claim 10, wherein the second web of plastic film has a film thickness of from 30 µm to 50 µm and the plastic separating film has a film thickness of from 30 µm to 50 µm.

13. A process in accordance with claim 10, wherein the plastic separating film consists of polytetrafluoroethylene (PTFE).

14. A process for manufacturing an electrolyte conductor, the process comprising the steps of:
providing a first web, the first web comprising a nonwoven fabric;
providing a second web, the second web comprising a plastic film;
laying the first web and the second web on top of one another;
partially laminating the second web onto only a single side of the first web in a pattern to form a composite web after laying the first web and the second web on top of one another, the first web comprising a second side opposite the single side, wherein the second side is not laminated; and
punching or cutting a two-dimensional shape out of the composite web or winding up the composite web to form a roll.

15. A process in accordance with claim 14, wherein the nonwoven fabric is a glass fiber mat, wherein no other side of the first web is laminated except for the single side of the first web.

16. A process in accordance with claim 14, wherein the nonwoven fabric has a thickness of less than 300 µm.

17. A process in accordance with claim 14, wherein the plastic film has a film thickness of at most 80 µm.

18. A process in accordance with claim 14, wherein the plastic film is a hot-melt adhesive film.

19. A process in accordance with claim 14, wherein a plastic separating film is laminated onto the second web comprising the plastic film, the plastic separating film having a heat resistance that is higher than a heat resistance of the second web comprising the plastic film.

20. A process in accordance with claim 19, wherein the plastic separating film has a film thickness of at most 80 µm.

* * * * *